J. P. C. GRANGER.
FILM WINDING DEVICE FOR CAMERAS.
APPLICATION FILED SEPT. 30, 1916.

1,215,142.

Patented Feb. 6, 1917.

UNITED STATES PATENT OFFICE.

JOSEPH P. CAMILLE GRANGER, OF MILWAUKEE, WISCONSIN, ASSIGNOR OF ONE-THIRD TO GUSTAV SCHIELKE, OF MILWAUKEE, WISCONSIN.

FILM-WINDING DEVICE FOR CAMERAS.

1,215,142.  Specification of Letters Patent.  Patented Feb. 6, 1917.

Application filed September 30, 1916.  Serial No. 122,993.

*To all whom it may concern:*

Be it known that I, JOSEPH P. CAMILLE GRANGER, a citizen of the United States, and resident of Milwaukee, in the county of Milwaukee and State of Wisconsin, have invented certain new and useful Improvements in Film-Winding Devices for Cameras; and I do hereby declare that the following is a full, clear, and exact description thereof.

The present invention relates to new and useful improvements in cameras and is directed, more particularly in connection with the ordinary types of film cameras, to provide an improved means for winding the film between successive picture taking operations.

In connection with the ordinary type of camera wherein the negative film is wound on spools, considerable inconvenience and liability to injure the negative is encountered in that an excessive winding may be imparted to the film between successive pictures.

A further disadvantage is the length of time necessarily consumed in manually winding the film, which materially interferes with taking pictures with a desired rapidity. It is therefore the object of the present invention to provide a means for mechanically winding the film between successive picture taking operations to thus provide for a more positive and more rapid winding action, it being more specifically an object to provide an electrically controlled winding mechanism.

It is further an object to provide a winding device which may be readily associated with conventional types of cameras with but very slight modifications thereof.

With the above and other objects and advantages in view, the invention resides more particularly in the novel combination, arrangement and formation of parts more particularly hereinafter described and pointed out in the appended claims.

Figure 1:
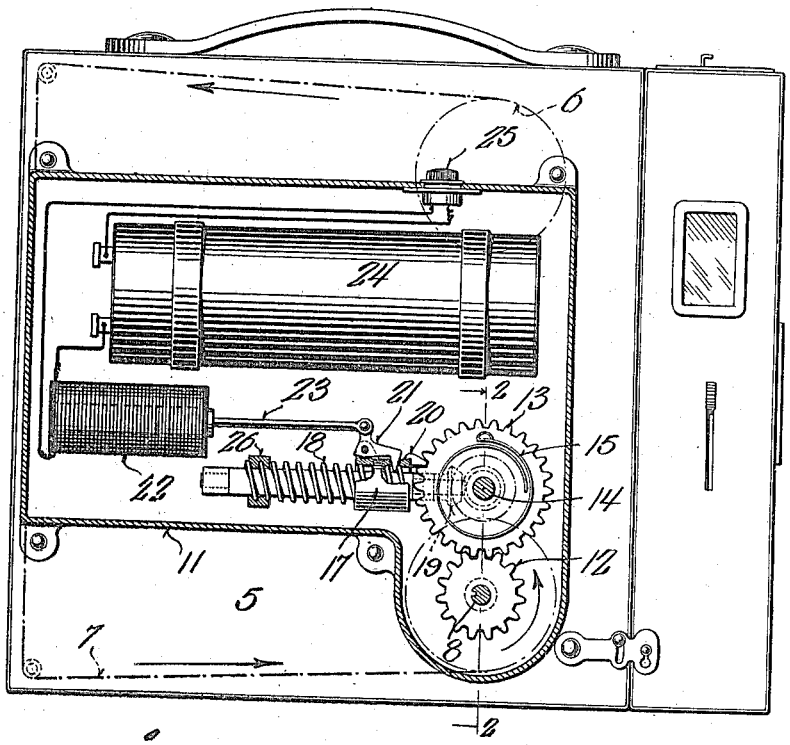
Figure 1 is a side elevation of a camera with the improved winding device associated therewith and with the casing of said device in section to more clearly disclose the structure, this section being indicated by the line 1—1 of Fig. 2.
Figure 2:
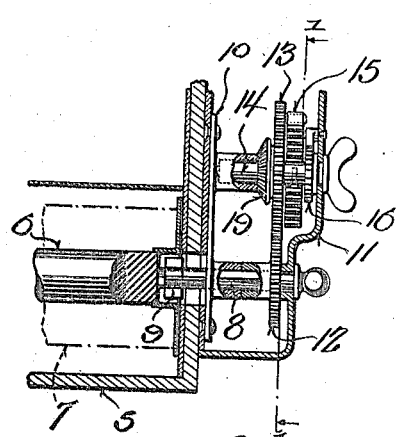
Fig. 2 is a transverse sectional view on the line 2—2 of Fig. 1.

Referring now more particularly to the accompanying drawings, 5 designates the main outer casing of a camera to which is detachably secured the front wall carrying the inner casing which has mounted in its forward side portions the usual film spools 6 carrying the film which is trained about the back of the camera as indicated at 7. The lower spool 6 receives the film from the upper spool during successive picture taking operations, and to detachably engage this spool for turning it, I provide the shaft 8 which extends through the casing 5 and is provided with wings 9 at its inner end engageable in the end of the spool, this shaft being similar to the conventional spool engaging shaft with the exception that, to provide a more free movement of the shaft, I eliminate the usual spring ratchet mechanism associated with this shaft, the necessity of this ratchet mechanism being obviated by the positive control which my present actuating means exerts on the shaft. The shaft is slidably journaled in a plate 10 secured to the side of the camera, and in the outer wall of the casing 11 which houses the entire winding device, the outer end of the shaft carrying a finger piece whereby it may be readily manipulated to disengage the shaft from the spool. Splined on the shaft 8 is a gear wheel 12 which meshes with a gear wheel 13 carried by the shaft 14 journaled also in the plate 10 and the outer wall of the casing. Wound on the shaft 14 and secured thereto and to the gear wheel 13 is a spiral spring 15, a suitable pawl and ratchet mechanism 16 being associated with the shaft to permit winding of the spring to impart power to the gear wheel 13.

To hold the gear wheel 13 against operative movement to wind the spool, a sleeve 17 is slidably mounted on a shaft 18 which is driven through the medium of beveled gears 19 carried thereon and on the gear wheel 13 respectively, and this sleeve is provided with a pawl tooth 20 engageable with the teeth of the wheel 13 to hold it against movement. The shaft 18 is threaded and pivoted on the sleeve to extend through an intermediate opening therein and to engage the threads of the shaft is a pawl 21. Thus when the sleeve is withdrawn from the gear wheel to disengage its tooth 20 from the teeth of the gear wheel, the said wheel will rotate to wind the spool, and at the same time the shaft 18 will be rotated to feed the sleeve 17 toward the gear wheel to engage its tooth 20 with the wheel and thus stop it.

Retraction of the sleeve to permit winding movement of the film is procured by means of a solenoid 22 which has its armature connected with a link 23 pivoted to a lateral arm of the pawl 21 whereby initial actuation of the solenoid will lift the tooth of the pawl from the threads of the shaft 18, and permit the pawl and sleeve upon further actuation of the solenoid to move away from the gear wheel. This solenoid is disposed in a circuit including a small battery 24, and is controlled by a push button switch 25 disposed in the circuit and carried at the side of the casing.

Thus by pushing the button 25, the sleeve will be retracted from the gear wheel and permit rotation thereof to wind the film. Inasmuch as the rotative movement imparted by the gear wheel to the film shaft corresponds to the rotative movement imparted to the shaft 18, the movement of the sleeve 17 on the shaft by reason of its engagement with the threads thereof, will correspond to the number of winding revolutions imparted to the spool and thus a means is provided for procuring the proper successive amounts of winding movement. Adjustment of the amount of winding movement imparted upon actuating the button 25 is procured by means of a collar 26 longitudinally adjustable on the shaft 18 and against which the sleeve 17 abuts, to thus control the length of return movement of the sleeve. In operation the push button 25 is actuated momentarily to close the circuit, and this momentary actuation energizes the solenoid sufficiently to move the sleeve to its limit of movement away from the gear wheel.

Although an electric control means has been shown for retracting the sleeve 17, it will be appreciated that other means could obviously be substituted, and it is therefore to be understood that with respect to this feature and to other features of the invention, various modifications and changes of structure may be employed without departing from the spirit of the present invention.

I claim:

1. The combination with a camera including a film winding shaft of a member engageable with said shaft to rotate it, a stop means for preventing actuation of said member upon a predetermined degree of rotation of the spool winding shaft, means for adjusting said stop means to vary the permitted degree of rotation of the spool winding shaft, and means for actuating said stop means to procure successive operations thereof.

2. The combination with a winding shaft of a gear wheel on the shaft, a spring driven gear wheel meshing with the first wheel, a pawl member engageable with one of the wheels to prevent rotation thereof, means for disengaging the pawl member from the wheel and means controlled by rotation of the wheel for engaging the pawl member with the wheel after a predetermined degree of rotation of said wheel.

3. The combination with a camera including a winding shaft, of a gear wheel on the shaft, a spring driven gear wheel meshing with the first wheel, a shaft driven by one of said wheels, threads on the shaft, a sleeve slidable on the shaft and engageable with the wheel to prevent rotation thereof, a pawl carried by the sleeve and engageable with the threads of the shaft, and means for moving the sleeve away from the wheel.

4. The combination with a camera including a winding shaft, of a gear wheel on the shaft, a spring driven gear wheel meshing with the first wheel, a shaft driven by one of said wheels, threads on the shaft, a sleeve slidable on the shaft and engageable with the wheel to prevent rotation thereof, a pawl carried by the sleeve and engageable with the threads of the shaft, and means for moving the sleeve away from the wheel including a switch controlled solenoid connected with the pawl.

In testimony that I claim the foregoing I have hereunto set my hand at Milwaukee, in the county of Milwaukee and State of Wisconsin, in the presence of two witnesses.

JOSEPH P. CAMILLE GRANGER.

Witnesses:
FRANK S. RATCLIFFE,
M. E. DOWNEY.

Copies of this patent may be obtained for five cents each, by addressing the "Commissioner of Patents, Washington, D. C."